US005111130A

United States Patent [19]

Bates

[11] Patent Number: 5,111,130

[45] Date of Patent: May 5, 1992

[54] CLAMP ACTIVATED JUMPER CABLE SWITCH

[76] Inventor: Wesley V. Bates, 1409 Bonita Ave., La Verne, Calif. 91750

[21] Appl. No.: 494,152

[22] Filed: Mar. 14, 1990

[51] Int. Cl.[5] .................... H01M 2/00; H01M 10/46; H01R 11/00; H01R 4/30

[52] U.S. Cl. .................................... 320/25; 429/1; 439/504

[58] Field of Search .................. 320/25, 26, 2; 429/1; 439/506, 504

[56] References Cited

U.S. PATENT DOCUMENTS

| | | | |
|---|---|---|---|
| 3,259,754 | 6/1966 | Matheson | 307/10.7 X |
| 3,659,183 | 4/1972 | Carlson | 320/25 |
| 4,145,648 | 3/1979 | Zender | 320/25 |
| 4,157,492 | 6/1979 | Colbrese | 320/25 |
| 4,163,134 | 7/1979 | Budrose | 320/47 X |
| 4,166,241 | 8/1979 | Grant | 320/25 |
| 4,180,746 | 12/1979 | Giuffra | 320/26 X |
| 4,238,722 | 12/1980 | Ford | 320/25 |
| 4,272,142 | 6/1981 | Zapf | 320/25 X |
| 4,286,172 | 8/1981 | Millonzi et al. | 320/25 X |
| 4,366,430 | 12/1982 | Wright | 320/25 |
| 4,400,658 | 8/1983 | Yates | 320/26 |
| 4,488,147 | 12/1984 | Signorile | 320/48 X |
| 4,527,111 | 7/1985 | Branham | 320/26 |
| 4,746,853 | 5/1988 | Ingalls | 320/25 |
| 4,796,586 | 9/1988 | Kazmierowicz | 320/26 |
| 4,897,044 | 1/1990 | Rood | 320/25 X |
| 4,938,712 | 7/1990 | Black | 320/25 X |
| 4,975,089 | 12/1990 | Lee | 439/504 X |

*Primary Examiner*—R. J. Hickey

*Attorney, Agent, or Firm*—Christie, Parker & Hale

[57] ABSTRACT

A safety device for an automobile battery has a light for indicating when jumper cables are properly attached to the battery, and a switch for electrically connecting a jumper cable attached to the device with a battery terminal. The device has a non-conductive housing supporting a fixed contact in electrical connection with one terminal of the battery by means of an integral clamp. A movable contact is formed by two metal plates on opposite sides of a head of the fixed contact, the plates being adapted to receive and be gripped between the jaws of a jumper cable clamp. The jumper cable clamp biases the plates toward the fixed contact. The device normally is in a non-conductive mode, in which the plates are prevented from moving together by one end of a lever disposed between the plates. The other end of the lever extends outside of the housing and has a handle. The lever is biased into the non-conductive position by a spring. The device also has an LED which lights when the clamp has the same polarity as the terminal to which the device is mounted. A user, in response to seeing the light, presses the handle to move the lever into a position where it moves out of the way of the plates allowing them to close against the head of the fixed contact. The lever will automatically move to the non-conductive position upon removal of the clamp. There is also an adaptor on which the device mounts when in a car with a side mount battery. In another embodiment of the invention, there is a ratchet for quickly and easily connecting or disconnecting battery terminals. The ratchet has a male or female threaded plug, and acts as a bolt or nut, respectively. The ratchet handle normally engages the plug so that the plug rotates with the handle. Tightly gripping the handle disengages the plug so that the handle rotates freely with respect to the plug.

30 Claims, 8 Drawing Sheets

CLAMP ACTIVATED JUMPER CABLE SWITCH

BACKGROUND OF THE INVENTION

The present invention relates to a device for safely connecting jumper cables, and in particular to a safety device which is clamp activated.

Car batteries often weaken or die so as to require a jump start. As is well known, to strengthen or revive a battery, one connects the positive terminal of a live battery to the positive terminal of the weak or dead battery and connects the negative terminals using jumper cables. The hazards of improperly connecting jumper cables are also well known. Most importantly, if the cables are crossed, the electrical and electronic systems of one or both of the cars may be damaged, and there is a risk of battery explosion.

Often, an uninitiated driver or user does not know or cannot determine how to connect the cables. For example, the user may be unable to ascertain the polarity of the terminals. Moreover, typical existing polarity detectors do not prevent an uninitiated user from connecting negative to positive and positive to negative. Therefore, there is a need for a simple to use, relatively fail-safe device to ensure that the jumper cables are connected correctly.

An additional problem relating to vehicle batteries is the need for quick and easy disconnection and reconnection of terminals, especially at automotive plants where new cars are often stored for several months before shipping. It is best to store the car with at least one terminal of the battery disconnected for reasons such as avoiding inadvertent battery drain and hindering theft. When it comes time to ship the cars, the battery is reconnected. It is desirable to reconnect the terminal without a wrench so as to streamline the shipping process.

SUMMARY OF THE INVENTION

The present invention is a safety device for detecting when jumper cables are properly attached, i.e., not crossed, prior to completing electrical connection of the terminals.

In a preferred embodiment, the device attaches to the positive terminal of at least one of the batteries. Jumper cables are connected between the terminals of the live and dead batteries, one of the cables having a clamp at one end which is connected to the device. The clamp attaches to two conductive contact plates so as to bias the plates toward one another. The device has a fixed electrically conductive contact having a head portion located between the two plates, and a remaining portion electrically connected to the positive terminal. Preferably, the fixed contact has a bore in which the positive terminal post slidably fits, and has a bolt and nut for reducing the diameter of the bore to clamp to the post. The device also has a switch in the form of a pivotably mounted lever movable between a "blocking" position and a "non-blocking" position. In the blocking position one end of the lever is between the two movable contact plates and prevents them from moving against the fixed contact head portion. In this position, the device is in a non-conductive or safety mode for preventing electrical connection of the terminal and clamp. In the non-blocking position the end of the lever is clear of the contact plates so that they move against the head portion under the influence of the jumper cable clamp. In this position, the device is in a conductive mode in which the clamp and terminal are electrically connected.

A spring biases the lever into the blocking position. Once the lever moves to the non-blocking position, the contact plates not only move against the head portion, but also prevent movement of the lever back to the blocking position until the jumper cable clamp is removed. The contact plates have curved surfaces for camming the end of the lever back into its blocking position when the clamp is removed. The device also has an LED electrically connected to one of the contact plates and a reference potential, such as the negative terminal. If the connected clamp is positive, current will flow from the clamp to the one contact plate through the LED to the negative terminal, thereby lighting the LED. The light indicates that it is safe to move the lever to the non-blocking position, and once the user does so, the cables will be correctly connected in electrical contact with the appropriate terminals. If the jumper cable clamp which is attached to the device is connected to the negative terminal of the other battery, the LED will not light due to the incorrect polarity of the applied voltage. After jump starting the battery, the user removes the clamp from the device. This automatically, due to the spring bias, moves the lever into the blocking position, separating the contact plates from the fixed contact head.

The device readily attaches to a top mount battery. The device also attaches to a side mount battery if there is sufficient room for it. If there is insufficient room, an adaptor according to an additional feature of the invention to convert a female side mount terminal to a male post on top of the battery. The adaptor preferably is L-shaped and conductive. One leg of the L-shape has an oval aperture. A bolt sandwiches a solenoid cable assembly against the one leg of the adaptor, the bolt extending through the cable assembly and the oval aperture into the female side mount terminal, thereby electrically connecting the terminal with the male post of the adaptor.

In accordance with a further aspect of the invention, there is a ratchet for quickly and easily disconnecting and connecting a battery terminal clamp such as used in the above-described safety device. The ratchet has either an internally threaded plug for receiving a bolt such as a bolt on a terminal clamp, or an externally threaded extension to the plug for threading inside a nut or a terminal with internal threads. The ratchet has a substantially U-shaped handle, one arm of which is rotatably mounted to the plug. The other arm has a hexagonal hole which normally engages a hexagonal nut fixed to the plug so that the plug rotates with the handle. Gripping the handle with sufficient force disengages the arm with the hexagonal hole from the nut, allowing both arms of the handle to freely rotate with respect to the plug.

The above features and advantages as well as additional features and advantages of the invention will be evident upon reading the detailed description in conjunction with the drawings.

DETAILED DESCRIPTION OF THE PREFERRED EMBODIMENT

The present invention is a safety device for determining when jumper cables have been connected properly between the terminals of two batteries.

Figure 1:
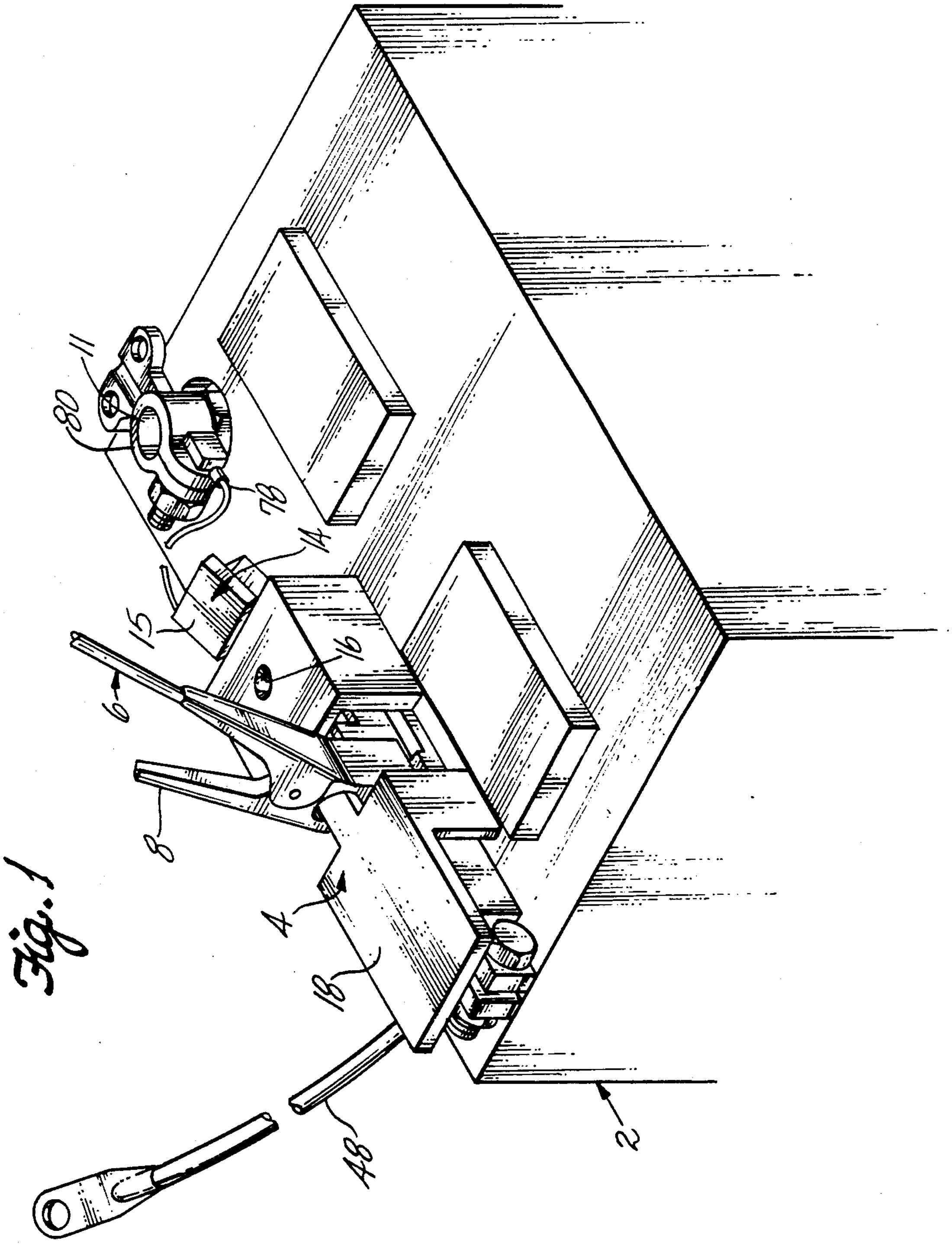
FIG. 1 is a perspective view of a safety device according to the invention installed on a battery with a jumper cable of unknown polarity attached to the device, and with the device in a non-conductive mode.
Figure 2:
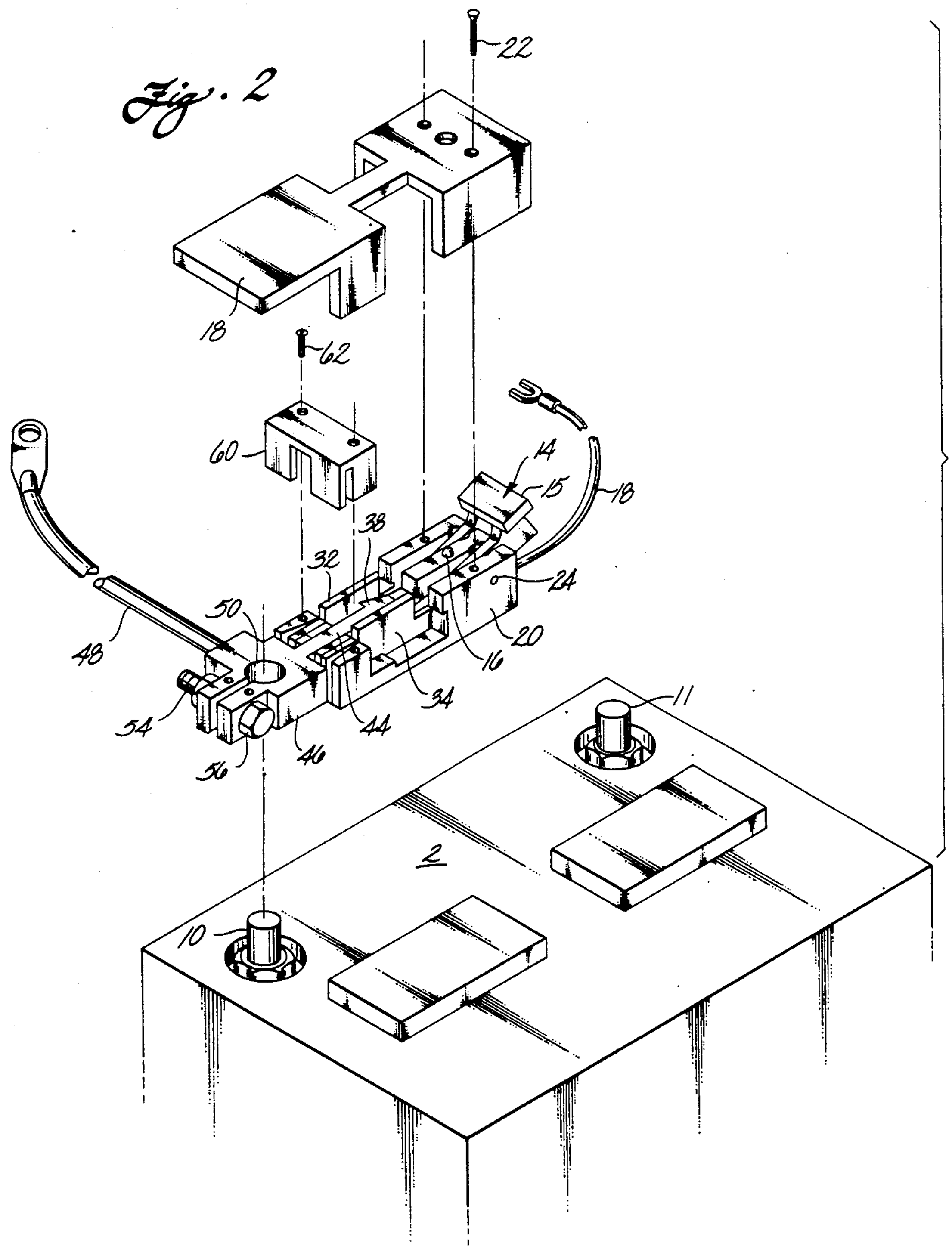
FIG. 2 is an exploded perspective view of the device of FIG. 1.

FIG. 1 shows a perspective view of a car battery 2 to which a safety device 4 according to the invention mounts, and FIG. 2 is an exploded perspective view of battery 2 and device 4. The device determines polarity of a source to which a jumper cable 6 is connected. That is, it determines whether or not the polarity of cable 6 matches the polarity of the terminal to which the device is connected. Cable 6 connects to device 4 by means of a clamp 8.

In the preferred embodiment, device 4 electrically connects and attaches to the positive terminal at post 10 of battery 2, as described later. Alternatively, the device attaches to the negative terminal at post 11.

In general, the device operates as follows: a driver (or user) in need of a jump start attaches one end of cable 6 to the device and the other end to one terminal of another battery. The user may also at this time attach another jumper cable (not shown) between negative post 11 of battery 2 and the remaining terminal of the other battery. Even though the device is attached to positive post 10, it is in a non-conductive or safety mode in which it does not allow electrical communication between cable 6 and post 10 unless the user operates a switch, i.e., a lever 14, by pressing down its handle 15. In safety mode the device tells the user when it is safe to push down handle 15 to enter a conductive mode (i.e., to complete the electrical connection between the two batteries).

In this embodiment, the device indicates proper cable connection by lighting an LED 16. When the LED lights, the user pushes down handle 15 which electrically connects cable 6 with positive terminal 10. If the LED does not light, the user knows the cables should be reversed, i.e., cable 6 should be connected to negative post 11, and the other cable should be connected to the device. When the user releases clamp 8 after jump starting the car, or for purposes of switching the cables, handle 15 automatically moves to its up position to break the electrical contact with positive post 10 until a new clamp is attached to the device and handle 15 is pressed down again.

Figure 5:
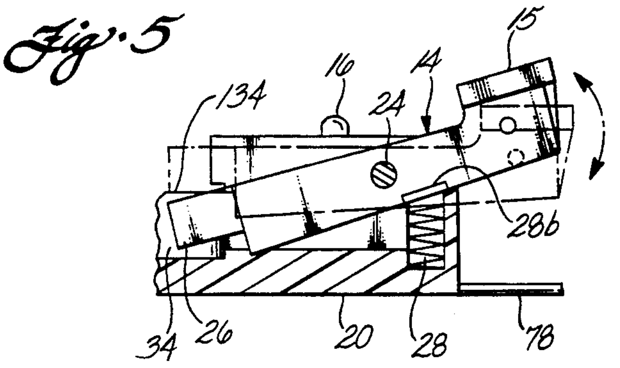
FIG. 5 is a partial cross-sectional view of the device of FIG. 3 taken along the line 5—5.

Operation of the device will be better understood by understanding its construction which is described in more detail with reference to FIGS. 3, 3A, 4 and 5, as well as FIGS. 1 and 2. The device has a non-conductive (e.g., plastic) housing formed by a cover plate 18 attached to a chassis 20, such as by screws 22. Chassis 20 pivotably supports lever 14 on a pin 24. The lever has an end 26 remote from handle 15. A spring or springs 28 bias lever 14 such that handle 15 is up and end 26 is down (e.g., FIG. 4 and solid lines in FIGS. 3A and 5). The springs are confined laterally by curved recesses 28*a* formed in the housing (FIG. 3), and preferably seat in recesses 28*b* in lever 14 (FIG. 5). However, the recesses 28*b* are not necessary. Alternatively, the springs could actually attach to lever 14, or simply seat in recesses 28*a* without attaching them to the lever.

Figure 3A:
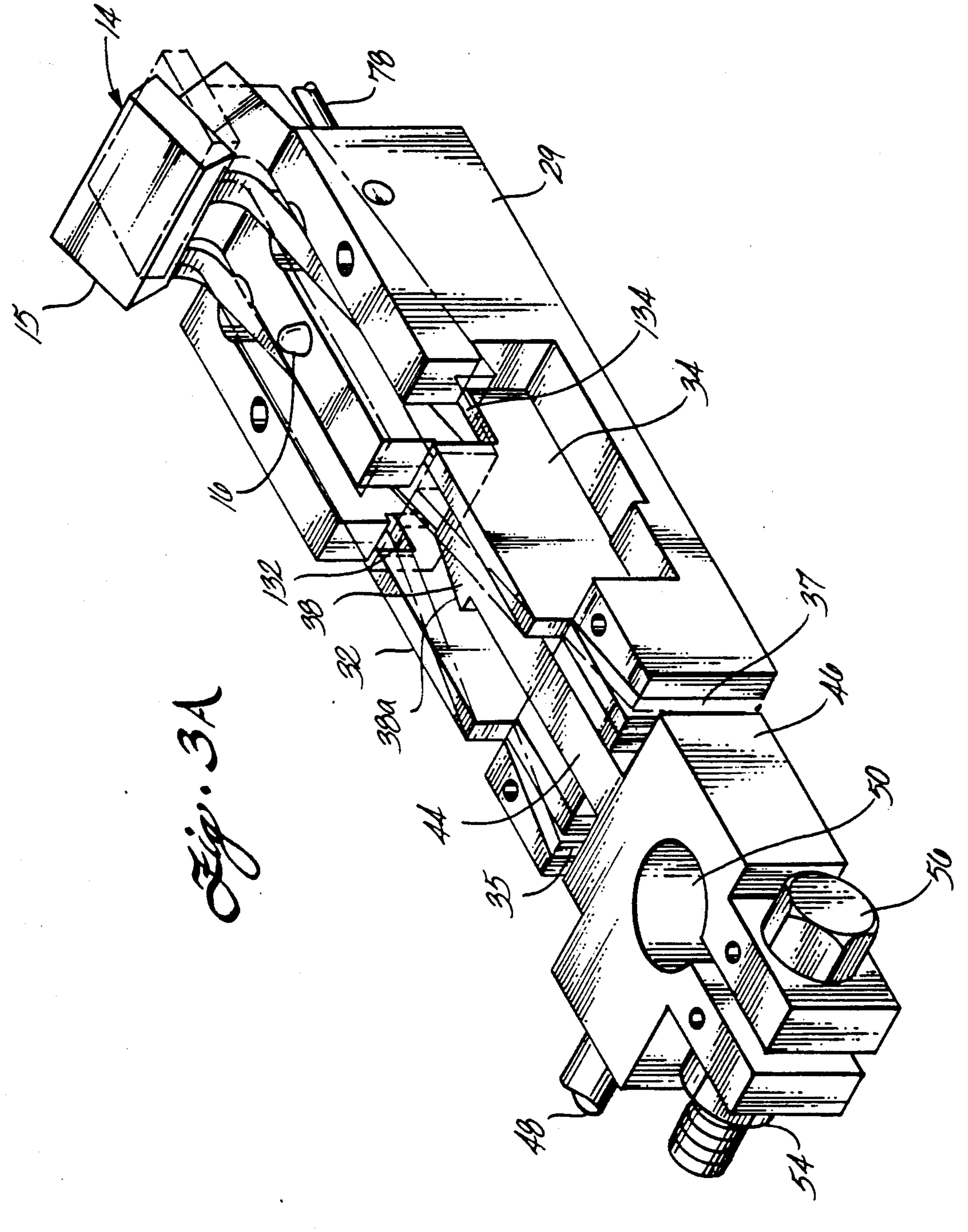
FIG. 3A is a perspective view of the device of FIG. 3 showing the device in its non-conductive mode in solid lines, and in its conductive mode in phantom.
Figure 3:
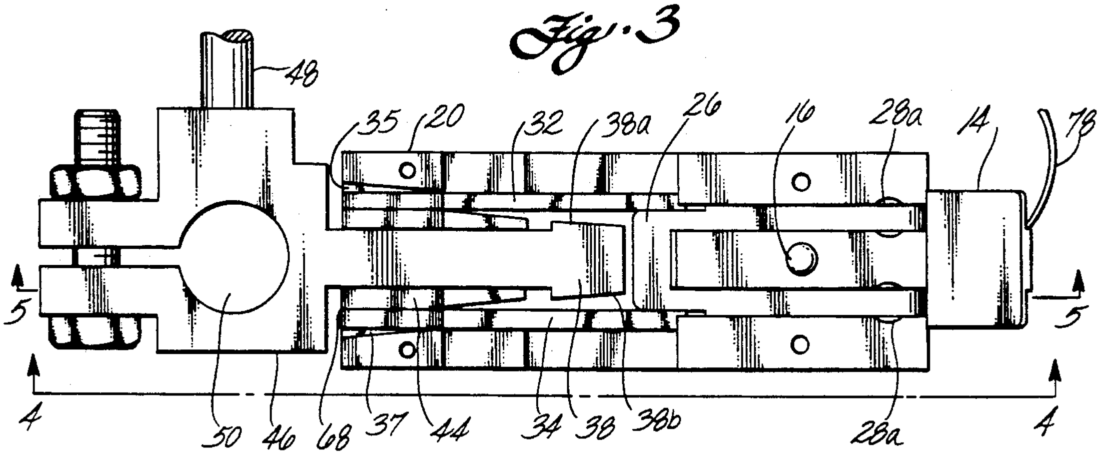
FIG. 3 is a top view of the device with a cover plate of its housing removed.
Figure 4:
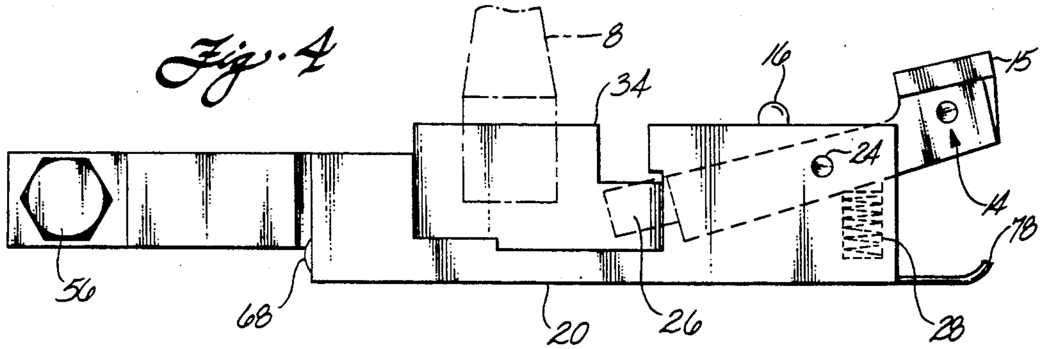
FIG. 4 is a view of the device of FIG. 3 taken along the line 4—4.

In safety mode, handle 15 is up and lever end 26 blocks electrical contact between jumper cable 6 and positive post 10. In conductive mode, handle 15 is down and electrical contact occurs between cable 6 and post 10, due to the following structure: clamp 8 engages metal (e.g., brass) contact plates 32, 34 which are seated in angled slots 35, 37 of chassis 20. Slots 35, 37 hold plates 32, 34 so that they can move between one position where they are substantially parallel and another position where they move closer together. In the disclosed embodiment, the plates 32, 34 move towards a V-shape, the angle of the slots to the parallel being about 5° (though the invention is not limited thereto). That is, the points of contact of the plates 32, 34 with clamp 8 move closer together, while the remote portions of the plates move away from each other. Plates 32, 34 are kept in the substantially parallel position by lever end 26 when end 26 is down (handle 15 is up as shown in FIGS. 3 and 3A), even though clamp 8 biases the plates toward contacting a fixed metal contact head 38 at surfaces 38*a*, 38*b*. The contact head, a metal contact arm 44, and a metal contact clamp or bracket 46 form a fixed contact. The arm 44 and bracket 46 (all of lead, for example) form a body of the fixed contact, through which head 38 electrically communicates with positive post 10. Bracket 46 is shown with an integrally attached wire 48 for connecting post 10 to a solenoid switch of the ignition system. Bracket 46 mounts on post 10 by means of a bore 50 in which the post fits. A nut 54 and bolt 56 fasten the bracket to the post. To help hold bracket 46 in the housing, arm 44 may be formed with a recess for engaging a corresponding projection from the bottom of the housing (not shown).

As noted above, handle 15 is normally biased upward so that end 26 is down, separating plates 32, 34 from surfaces 38*a*, 38*b* of contact head 38. When clamp 8 attaches to plates 32, 34, the plates are biased toward head 38. Pressing handle 15 down will bring end 26 upward above the top of camming surfaces 132, 134 of plates 32, 34, allowing the clamp to move the plates against contact heads 38 (as shown in phantom in FIG. 3A). To avoid unwanted electrical communication between plates 32, 34 and bracket 46, the housing has a detachable insulating bracket 60 fastened to chassis 20, e.g., by screws 62.

Figure 7:
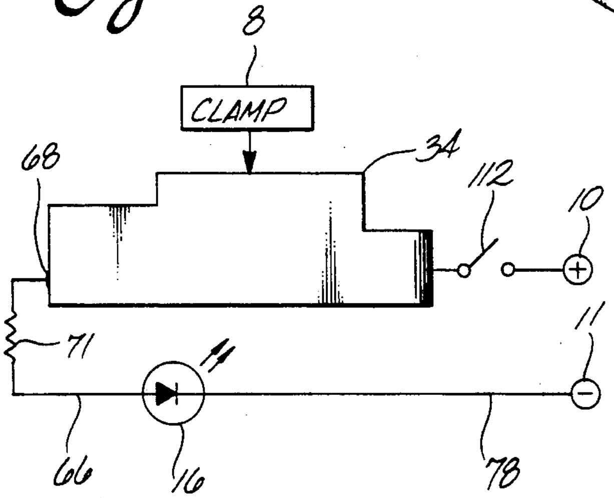
FIG. 7 is a schematic view of an electrical circuit of the device and battery.

To detect when the cables are properly connected, the device has a polarity detection circuit (FIG. 7). Clamp 8 connects through one plate (e.g., 34) or both plates by a wire 66 soldered at 68 to plate 34. The plate 34 communicates with LED 16 through a current limiting resistor 71. LED 16 connects to wire 78 through a terminal clamp 80 (connected by a nut and bolt in FIG. 1) to negative post 11.

A switch 112 represents the difference between the conductive and non-conductive modes of the device. In the non-conductive mode, switch 112 is in the open position to electrically isolate positive post 10. If clamp 8 is positive, current flows and lights LED 16.

Conductive mode is represented by the closed position of switch 112. If clamp 8 is properly connected to the positive terminal of the other battery, all or substantially all of the current will flow between clamp 8 and positive terminal post 10, due to the relatively high resistance of the path through the resistor 71 and LED 16.

Figure 6:
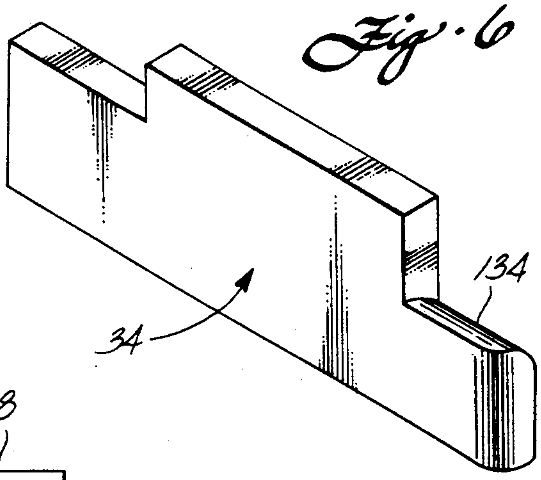
FIG. 6 is a perspective view of a contact plate in the device according to the invention.

Surfaces 132, 134 are curved (FIG. 6) to cam end 26 between plates 32, 34 to separate them when clamp 8 is removed. More specifically, the bias of spring 28 will force lever end 26 into its blocking position when clamp 8 is removed from plates 32, 34.

Figure 8:
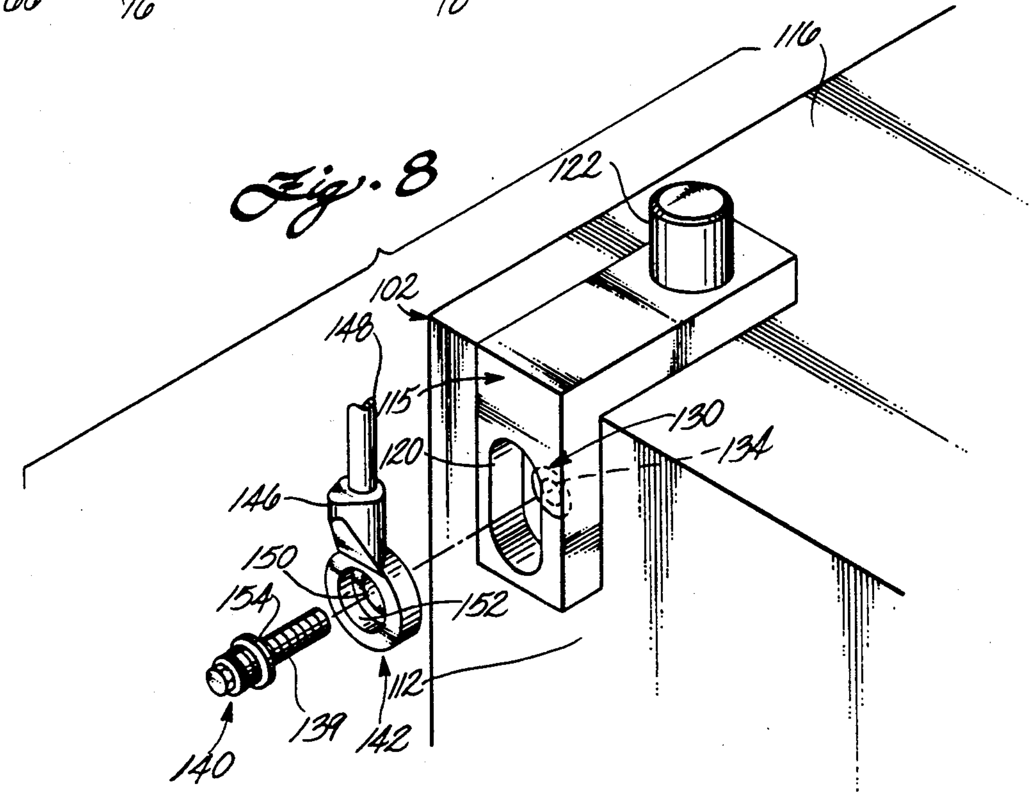
FIG. 8 is a perspective, exploded view of an adaptor for a side mount battery to enable the safety device to attach to the top of the battery.

The device according to the invention readily attaches to top mount batteries (i.e., batteries with terminal posts on their top surface). The device is also suitable for side mount batteries (terminals on the side); however, vehicles having such batteries normally have insufficient space between the battery and vehicle frame for installation of the device. A further aspect of the present invention overcomes this installation problem. As shown in FIG. 8, a side mount battery 102 has a terminal 130 (e.g., positive) on its side surface 112 with an adaptor 115 of an electrically conductive material. Adaptor 115 is roughly L-shaped with one leg resting on top surface 116 of the battery, and having a post 122 to which the inventive safety device attaches the same way as in the case of top mount battery 2 (see, e.g., FIG. 2). The other leg has an oval hole 120.

FIG. 8, as drawn, requires slight modification of the safety device. In particular, side mount terminal 130 has a female threaded hole 134 for receiving an externally threaded plug 139 of a bolt 140. A solenoid wire contact assembly 142 has an electrically conductive head 146 to which a solenoid wire 148 attaches. Solenoid wire 48 (e.g., FIG. 1 attached to contact bracket 46 of the safety device is thus unnecessary. Alternatively, solenoid wire 148 could be eliminated by keeping wire 48.

Head 146 has a hole 150 for allowing plug 139 to pass through, and an annular recess 152 for receiving a mating surface 154 of bolt 140. Head 146 may also have an annular projection (such as projection 156 in FIG. 13) for mating with terminal 130 and a flat surface (shown as surface 164 in FIG. 13) for contacting adaptor 115 and holding it in place. Thus, threaded plug 139 fits through the solenoid wire contact assembly 142, through the oval hole 120, and mates with threaded hole 134, to press fit assembly 142 against the adaptor 115 (with the projection 156, if any, in the oval hole). Therefore, terminal 130 electrically connects to post 122 through bolt 140, then assembly 142, then the adaptor 115.

Figure 9:
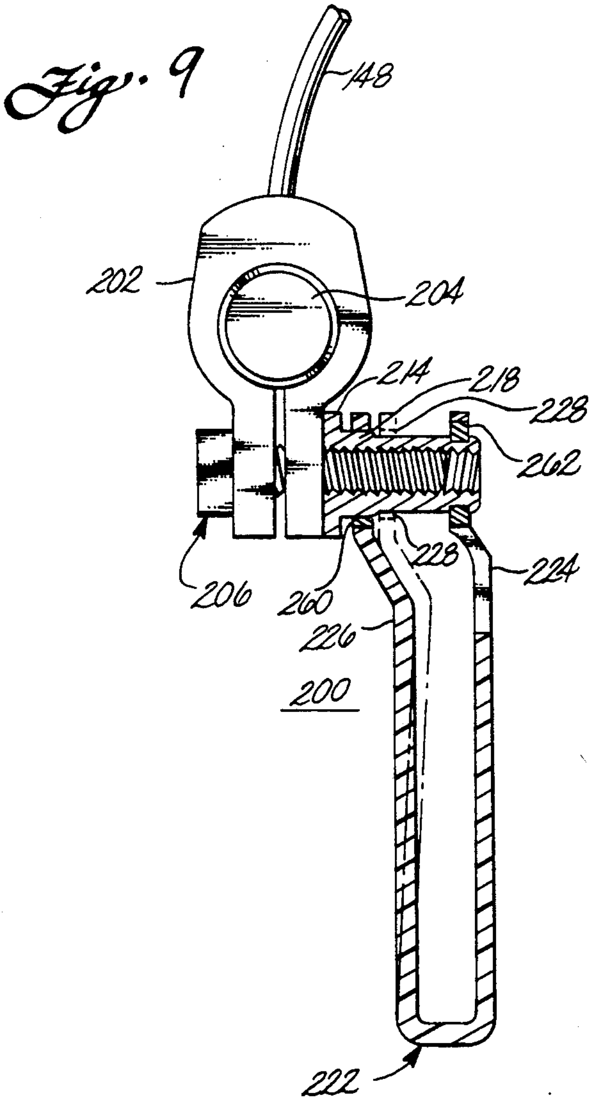
FIG. 9 is a partial cross-sectional view of one embodiment of an inventive ratchet for threading to a bolt of a terminal clamp, a handle of the ratchet being shown in solid where it is in position for wrenching and in phantom where it is in position for freely rotating.
Figure 10:
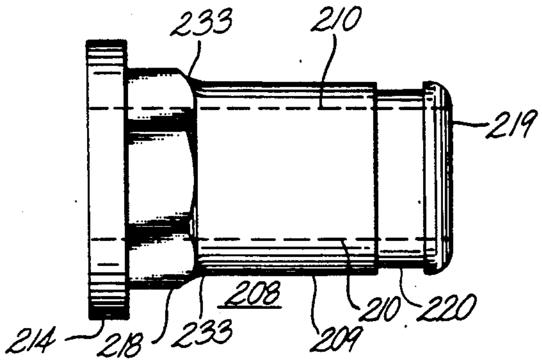
FIG. 10 is an exterior view of a component of the ratchet of FIG. 9.

In accordance with another aspect of the invention, as shown in FIGS. 9 and 10, a ratchet is built into the terminal clamp for quick connection or disconnection.

FIG. 9 shows a partial cross-sectional view of one embodiment of a built-in ratchet 200 according to the invention. Ratchet 200 attaches to a terminal clamp 202, which surrounds a terminal post 204, by threading to a bolt 206. That is, ratchet 200 has a plug 208 with internal threads 210 (best shown in FIG. 10), thus functioning as a self-adjustable nut. The ratchet tightens or loosens without a wrench.

Ratchet 200 has a round flange 214 at one end of plug 208 for abutting clamp 202, a hexagonal nut or projection 218 adjacent to the flange, a cylindrical portion 209, a plug head 219, and an annular recess 220 adjacent to the plug head. The ratchet also has a handle 222 with arms 224, 226. Recess 220 rotatably receives one arm 224 preventing lateral motion of the arm along the plug. The other arm 226 has a hexagonal hole 228 rotatably mounted on plug 208 and slidable along the plug. Arm 226 is normally in a wrenching position (shown in solid lines) with hexagonal hole 228 fitting at least partly over nut 218 so that internally threaded plug 208 rotates with handle 222. When a user grips handle 222 with sufficient force, arm 226 moves to the dashed position in which it freely rotates around plug 208. Accordingly, with the handle in the solid position, the ratchet tightens or loosens its hold on terminal clamp 204, thus enabling quick and easy disconnection and reconnection of clamp 202. Arm 226 is biased into the wrenching position. To aid seating of hole 228 on nut 218, the plug 208 preferably has a smooth surface 233 (FIG. 10) connecting nut 218 With cylindrical portion 209. In the preferred embodiment, handle 222 has a jog in it to provide for clearance from terminal clamp 202 or other objects.

Figure 11:
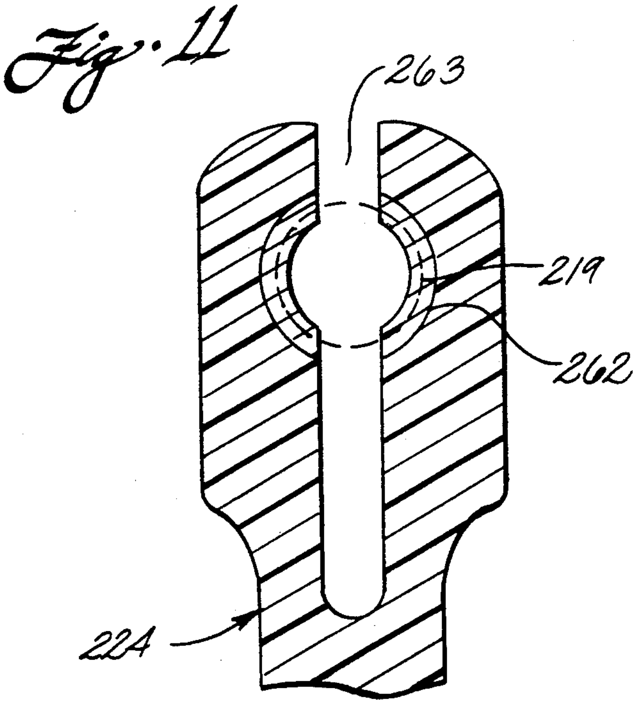
FIG. 11 is a partial cross-sectional view of one handle of the ratchet of FIG. 9.
Figure 12:
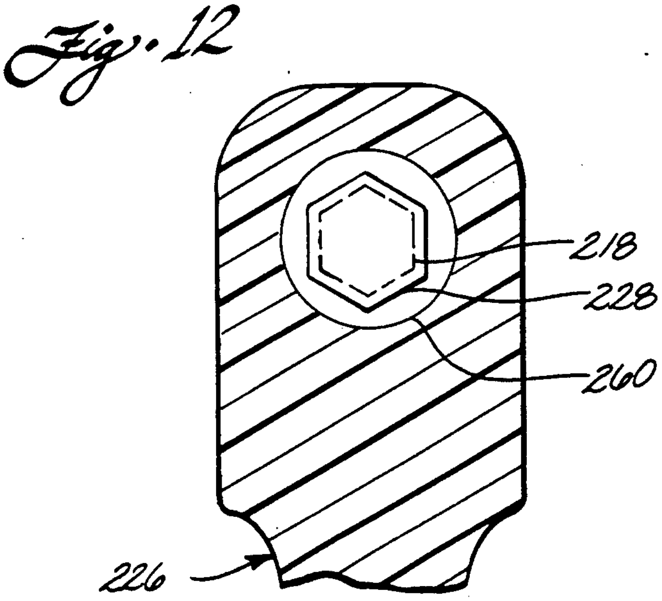
FIG. 12 is a partial cross-sectional view of another handle of the ratchet of FIG. 9.

FIGS. 11 and 12 show blown up cross-sections of arms 224 and 226, respectively, of the ratchet. Arm 224 has a slot 263 so that it can be forced open to slip over plug head 219 (shown in phantom) into place in recess 220 (not shown in FIG. 11). Hexagonal hole 228 of arm 226 is sized to fit over plug end 219 and mate with hexagonal nut 218 (shown in phantom).

Figure 13:
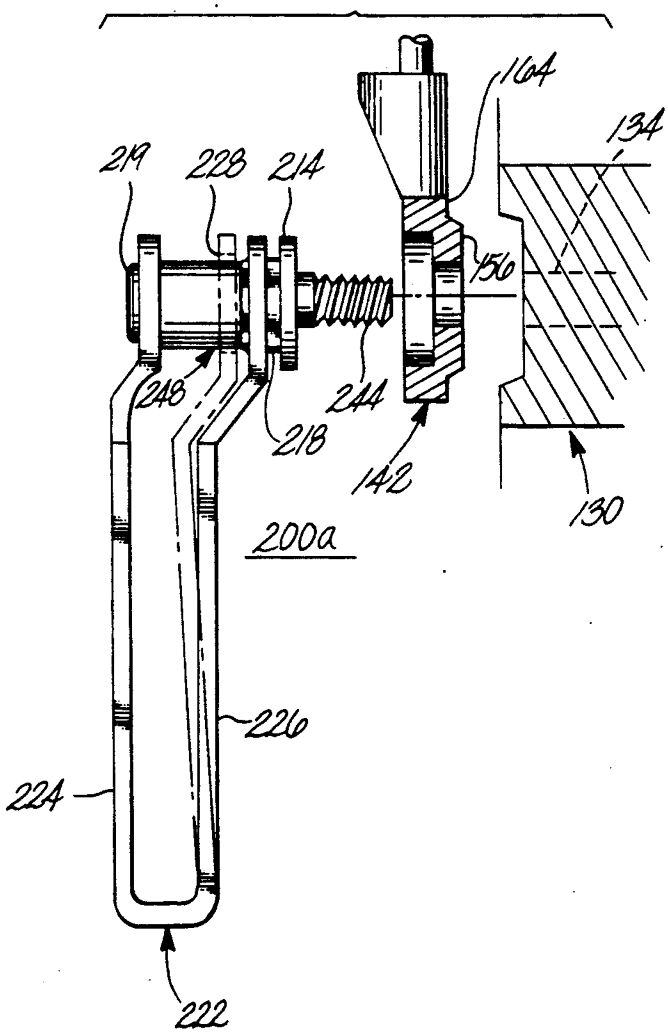
FIG. 13 is a side view of another embodiment of the inventive ratchet for threading to an internally threaded side mount terminal (shown in section), the ratchet handle being shown in solid where it is in position for wrenching and in phantom where it is in position for freely rotating.

FIG. 13 shows a second embodiment where a ratchet 200*a* has an externally threaded extension 244 on a plug 248 for mounting a solenoid wire assembly 142 (such as shown in FIG. 8) to internally threaded hole 134 in (side mount) terminal 130. In particular, ratchet 200*a* is the same as ratchet 200, except for threaded extension 244 rather than internal threads 210. In FIG. 13, elements of ratchet 200*a* which are the same as those of ratchet 200 (FIG. 9) have the same reference numbers.

Handle 222 is preferably a resilient, non-conductive material such as plastic, with a metal insert 260 (FIG. 9) forming hexagonal hole 228 to provide better wear resistance. Arm 224 is also shown with a metal insert 262 (FIG. 9). Alternatively, the handle is entirely metal.

With the above construction, the device indicates whether the polarity of the attached jumper cable is the same as that of the terminal to which the device attaches, e.g., by lighting an LED. The device prevents electrical connection between the cable and the terminal until placed in conductive mode by pressing down handle 15 against its upward bias. This moves a lever out of its blocking position, and allows the biasing force of the clamp to move the plates into contact with the head of the contact arm. Accordingly, the jumper cable electrically connects to the positive terminal. Removal of the cable will result in the lever moving back to its blocking position due to the spring bias, as the end of the lever will coact with curved surfaces on the plates to cam the plates apart.

The scope of the present invention is set forth in the claims and is not intended to be limited to the disclosure. For example, in the disclosed embodiment the device is mounted on the positive terminal, but it could be mounted to the negative terminal in the same fashion, with wire 78 directly attached to the positive terminal and wire 48 separated from the device so that it can connect the positive terminal to the solenoid. The only other modification necessary to the device is to reverse LED 16 and the resistors so that the LED will light when clamp 8 is negative. Alternatively, the user could press down the handle when the LED does not light, and switch the jumper cables when the LED does light.

It should be noted that if both the live and dead batteries have the safety device on terminals of the same polarity (e.g., both positive or both negative), one of the devices must be switched to conductive mode so that the other device will be able to detect a proper or improper connection.

Other aspects of the invention are also subject to obvious modifications, such as using the ratchet of FIG. 11 as a bolt in FIG. 9 and fastening the ratchet to the clamp using a nut. Further, the ratchet may be used in combination with the safety device by replacing bolt 56 (FIG. 2) with the ratchet of FIG. 13 or replacing nut 54 (FIG. 2) with the ratchet of FIG. 9.

What is claimed is:

1. A safety device for a battery, comprising:

(a) a fixed contact electrically connected to one terminal of the battery;

(b) a movable contact adapted for attachment of an electrically conductive clamp of unknown polarity, and for being biased toward the fixed contact under the influence of the clamp;

(c) switch means biased into a safety position for electrically separating the movable and fixed contacts, and movable to an operative position for allowing the clamp to move the movable contact into electrical communication with the fixed contact; and (d) indicating means electrically connected to a reference potential and to the movable contact for indicating whether the unknown polarity is the same as a polarity of the one terminal;

whereby a user can operate the switch to electrically connect the clamp to the one terminal when the indicating means indicates that the unknown polarity is the same as the polarity of the one terminal.

2. The device of claim 1 wherein the one terminal is positive.

3. The device of claim 1 wherein the reference potential is the other terminal of the battery.

4. The device of claim 1 further comprising means for biasing the switch into the safety position and for moving the switch into the safety position from the operative position in response to removal of the clamp.

5. The device of claim 1 further comprising a non-conductive housing, and wherein the movable contact comprises two metal plates disposed in the non-conductive housing on opposite sides of the fixed contact.

6. The device of claim 5 wherein the fixed contact comprises a metal member having a head disposed between the plates and a body comprising a bracket having a bore for receiving the one terminal, and the device further comprises means for fastening the bracket to the one terminal by reducing the size of the bore.

7. The device of claim 1 further comprising a housing, and wherein the switch means comprises an arm pivotably mounted to the housing, a handle on one side of the arm and extending out of the housing, and the other side of the arm is movable from between the plates to away from the plates.

8. The device of claim 7 wherein the plates have surfaces for camming the other side of the arm into position between them upon removal of the clamp from the device.

9. The device of claim 1 wherein the indicating means comprises an LED.

10. The device of claim 9 further comprising means for providing a high resistance relative to the resistance between the clamp and the one terminal, the means for providing a high resistance being electrically connected between the movable contact and the LED.

11. A safety device for a battery, comprising:

(a) conductive means electrically connected to one terminal of the battery;

(b) movable means adaptable for attachment of an electrically conductive clamp of unknown polarity and for moving into contact with the conductive means, under the influence of the clamp, to electrically connect the clamp and the conductive means;

(c) switch means biased into a safety position for preventing the movable means from moving into contact with the conductive means, and movable to an operative position for allowing the clamp to move the movable means into contact with the conductive means; and (d) indicating means electrically connected to a reference potential and to the movable means for indicating whether the unknown polarity is the same as a polarity of the one terminal, whereby a user can move the switch means to the operative position to electrically connect the clamp to the one terminal when the indicating means indicates that the unknown polarity is the same as the polarity of the one terminal.

12. The device of claim 11 wherein the one terminal is positive.

13. The device of claim 11 wherein the reference potential is the other terminal of the battery.

14. The device of claim 11 further comprising means for biasing the switch into the safety position, and for moving the switch into the safety position from the operative position in response to removal of the clamp.

15. The device of claim 11 further comprising a non-conductive housing, and the movable contact comprises two metal plates disposed in the housing on opposite sides of the fixed contact.

16. The device of claim 15 wherein the fixed contact comprises a metal member having a head disposed between the plates and a body comprising a clamp having a bore for receiving the one terminal, and the device further comprises means for fastening the clamp to the one terminal by reducing the size of the bore.

17. The device of claim 11 further comprising a housing wherein the switch means comprises an arm pivotably mounted to the housing, a handle on one side of the arm and extending out of the housing, and the other side of the arm is movable from between the plates to away from the plates.

18. The device of claim 17 wherein the plates have surfaces for camming the other side of the arm into position between the plates upon removal of the clamp from the device.

19. The device of claim 11 wherein the indicating means comprises an LED.

20. The device of claim 19 further comprising means for providing a high resistance relative to the resistance between the clamp and the one terminal, the means for providing a high resistance being electrically connected between the movable contact and the LED.

21. A combination of a battery and a safety device, the battery having first and second terminals, one of which is positive and one of which is negative, the safety device comprising a non-conductive housing, a fixed contact electrically connected to a first terminal of the battery, a movable contact adapted for attaching an electrically conductive clamp of unknown polarity, and for being biased toward the fixed contact under the influence of the clamp, switch means biased into a safety position for electrically separating the movable and fixed contacts and movable to an operative position for allowing the clamp to move the movable contact into electrical connection with the fixed contact, and indicating means electrically connected to a reference potential and to the movable contact for indicating whether the unknown polarity is the same as a polarity of the first terminal, whereby a user can operate the switch to electrically connect the clamp to the first terminal when the indicating means indicates that the unknown polarity is the same as the polarity of the first terminal.

22. A combination of a battery and a safety device, the battery having first and second terminals, one of which is positive and one of which is negative, the safety device comprising a non-conductive housing, conductive means electrically connected to the first terminal of the battery including means for mounting the housing to the first terminal, movable means adaptable for attaching an electrically conductive clamp of unknown polarity and for moving into contact with the conductive means under the influence of the clamp to electrically connect the clamp and the conductive means, switch means biased into a safety position for preventing the movable means from moving into contact with the conductive means, and movable to an operative position for allowing the clamp to move the movable means into contact with the conductive means, and indicating means electrically connected to a reference potential and to a movable contact for indicating whether the unknown polarity is the same as a polarity of the one terminal, whereby the user can operate the switch means to electrically connect the clamp to the one terminal when the indicating means indicates that the unknown polarity is the same as the polarity of the one terminal.

23. The combination of claim 21 wherein the battery is a side mount battery having a side surface at which the first terminal is disposed, and a top surface for mounting the device, and further comprising means having an upwardly extending post for electrically connecting the first terminal with the device.

24. The combination of claim 22 wherein the battery is a side mount battery having a side surface at which the first terminal is disposed, and a top surface for mounting the device, and further comprising means having an upwardly extending post for electrically connecting the first terminal with the device.

25. The combination of claim 21 wherein the safety device further comprises means for clamping the device to the one terminal, the means for clamping comprising a clamp, and means for tightening the clamp, the means for tightening comprising a ratchet and one of a nut and a bolt.

26. The combination of claim 25 wherein the ratchet comprises:

- a substantially U-shaped handle having first and second arms; and
- an elongate plug having one of an external threaded portion or an internal threaded portion;
- wherein the first arm of the handle is mounted around the plug for rotation with respect to it, and the second arm of the handle is biased into a wrenching position in which the plug rotates with the handle to thread or unthread the plug, the second arm being movable into a non-wrenching position in which the second arm rotates freely with respect to the plug.

27. The combination of claim 26 wherein the plug has internal threads and attaches to a bolt.

28. The combination of claim 22 wherein the safety device further comprises means for clamping the device to the one terminal, the means for clamping comprising a clamp, and means for tightening the clamp, the means for tightening comprising a ratchet and one of a nut and a bolt.

29. The combination of claim 28 wherein the ratchet comprises:

- a substantially U-shaped handle having first and second arms; and
- an elongate plug having one of an external threaded portion or an internal threaded portion;
- wherein the first arm of the handle is mounted around the plug for rotation with respect to it, and the second arm of the handle is biased into a wrenching position in which the plug rotates with the handle to thread or unthread the plug, the second arm being movable into a non-wrenching position in which the second arm rotates freely with respect to the plug.

30. The combination of claim 29 wherein the plug has internal threads and attaches to a bolt.

* * * * *